United States Patent [19]

Ohashi et al.

[11] Patent Number: 4,637,482
[45] Date of Patent: Jan. 20, 1987

[54] HYDRAULIC SYSTEM IN WORKING VEHICLES

[75] Inventors: Ryota Ohashi, Sakai; Masahisa Kawamura; Jiro Shibata, both of Amagasaki, all of Japan

[73] Assignee: Kanzaki Kokyukoki Mfg. Co. Ltd., Amagasaki, Japan

[21] Appl. No.: 827,952

[22] Filed: Feb. 10, 1986

[30] Foreign Application Priority Data

Mar. 29, 1985 [JP] Japan ............................ 60-46488[U]

[51] Int. Cl.$^4$ ............................................. B62D 5/08
[52] U.S. Cl. ..................................... 180/132; 60/422; 91/516; 137/625.66
[58] Field of Search .................. 180/132, 306; 60/422; 91/516; 137/625.66

[56] References Cited

U.S. PATENT DOCUMENTS

| 4,213,511 | 7/1980 | Rubenstein et al. | 180/139 |
| 4,385,674 | 5/1983 | Presley | 60/422 X |
| 4,420,934 | 12/1983 | Udono | 60/422 |

FOREIGN PATENT DOCUMENTS 57-198404 12/1982 Japan .

Primary Examiner—John A. Pekar

[57] ABSTRACT

In a working vehicle comprising a hydraulic power steering cylinder (25) and hydraulic lift cylinder (31), a novel hydraulic system is employed which comprises a flow control valve means (47) having an orifice (51) and relief valve (52) and arranged such that it divides output flow of a single pump (43) driven by engine (10) into a constant flow directed towards steering cylinder and a surplus flow directed towards lift cylinder. Piston (54) is particularly provided which varies, in cooperation with an orifice (55) between the pump and control valve means, the biasing force of valve spring (53) of the relief valve so as to vary the flow directed towards steering cylinder within a predetermined range in response to engine speed. The system is fashioned such that it secures a flow for a relatively quick operation of lift cylinder at a low engine speed while securing a predetermined constant flow for steering cylinder at the normal engine speeds.

4 Claims, 6 Drawing Figures

HYDRAULIC SYSTEM IN WORKING VEHICLES

BACKGROUND OF THE INVENTION

This invention relates to a hydraulic system employed in working vehicles performing for example goods loading, mowing, reaping, earth moving operations and the like.

More particularly the present invention relates to a hydraulic system for use in a working vehicle which comprises a hydraulic power steering mechanism, including a power cylinder, and a hydraulic lift mechanism including a lift cylinder, the power cylinder and lift cylinder being powered by a single pump driven by engine.

In general, such hydraulic system is fashioned such that it comprises a flow divider means for dividing output flow of a single pump into two flows one of which is directed towards the power cylinder and the other of which is directed towards the lift cylinder. Because it is required for a stable and safe steering of vehicle to turn vehicle steering wheels or front wheels with a predetermined constant rate, such flow divider means is fashioned in many cases so that it operates to secure a predetermined constant flow or flow rate for the power cylinder so as to operate such cylinder with a predetermined constant speed or rate. Thus, flow control valve means is provided which divides output flow of a single pump into a predetermined constant flow to be directed towards power cylinder and a surplus flow in excess of such constant flow. Lift cylinder of a hydraulic lift mechanism is thus operated by the surplus flow having a value substracted the predetermined constant flow from pump output flow.

Flow control valve means of the type set forth above does not provide any flow in its surplus flow outlet port when output flow of a single pump is less than a predetermined constant flow to be secured at the constant flow outlet port of such valve means. In a hydraulic system in which such flow control valve means is employed, lift cylinder of a hydraulic lift mechanism cannot thus be operated when engine speed is very low so that output of a single pump driven by engine is less than a predetermined constant flow to be secured for operating power steering cylinder with a predetermined constant rate. Within some low range of engine speed, flow of fluid directed towards the lift cylinder is very small so that such cylinder is operated to extend at a very small rate. Such slow extension of lift cylinder will result in a very slow lifting of working implement to be lifted by hydraulic lift mechanism.

Lifting of a working implement which is connected pivotally to a working vehicle so as to be lifted and lowered by hydraulic lift mechanism is often required even at a low speed of engine and even in an idling condition of engine. For example, such working implement is usually lifted in an idling condition of engine before working vehicle is put out of garage. During a working operation which is performed at a creep speed of vehicle, a quick lifting of working implement is required or at least desirable in response to an emergency. It is thus seen that inconvenience has been experienced.

SUMMARY OF THE INVENTION

Accordingly, a primary object of the present invention is to provide a novel hydraulic system for use in working vehicles which permits a relatively quick lifting of working implement at a low speed range of engine while permitting fluid supply of a predetermined constant rate to power steering cylinder at the normal speeds of engine.

An attendant object is to provide a hydraulic system which attains the primary object set forth above without complicating structure of the system.

In the hydraulic system according to the present invention, a flow control valve means is provided for securing a predetermined constant flow for power steering cylinder at the normal engine speeds. Such control valve means includes an orifice and relief valve which are combined such that a constant flow is secured at a first outlet port connected to the power steering cylinder while a surplus flow in excess of such constant flow is obtained in a second outlet port connected to hydraulic lift cylinder. The constant flow referred to above is determined by the flow area of the orifice and by the biasing force of valve spring of the relief valve.

For varying flow rate secured at the first outlet port of flow control valve means within a predetermined range, a piston is particularly provided which receives the base end of valve spring of the relief valve so as to vary the biasing force of such spring when the piston is moved within a predetermined range.

Another orifice is incorporated in a fluid supply path between a single pump and the flow control valve means. This another orifice is employed for varying the position of piston set forth above in response to pressure differential caused across such orifice. For this, fluid pressure in the upstream of such orifice is applied to the piston so as to urge it towards the valve spring and fluid pressure in the downstream of such orifice is applied to the piston so as to urge it away from the valve spring.

Pressure differential across the another orifice is enlarged with the increase of pump output flow and, therefore, with the increase of engine speed. Flow area of such another orifice is preset so that the piston is moved from its one end position, where the biasing force of valve spring is made smallest, to another end position, where such biasing force is made largest, by pressure differential caused across the another orifice within a predetermined low speed range of the single pump and engine. The piston is thus kept in its one end position at engine speeds below such predetermined range and in its another end position at engine speeds above the predetermined range.

A constant flow of fluid to be supplied to power steering cylinder at the normal engine speeds is secured in a condition that the piston is kept in its another end position set forth above where the biasing force of valve spring of the relief valve is made largest. Nevertheless, a substantial flow of fluid is secured for hydraulic lift cylinder at a low engine speed. This is because when engine speed is low the piston is placed either at its one end position set forth above or at a position between the two end positions thereof so that the biasing force of valve spring of the relief valve is made relatively small. Consequently, flow of fluid directed towards power steering cylinder is made smaller than the constant flow secured at the normal engine speeds. By this, flow of fluid for hydraulic lift cylinder is secured even within a low speed range of engine and this flow is enlarged with the increase of engine speed within such low speed range of engine. It is thus seen that a substantial flow is secured at a low engine speed for operating hydraulic lift cylinder relatively quickly.

As described before, a flow control valve means similar to that employed in accordance with the present invention has generally been employed in a hydraulic system according to the prior art. The present invention will thus employ only a piston and an orifice as additional components. Structure of the hydraulic system is thus not complicated substantially.

BRIEF DESCRIPTION OF THE DRAWINGS

Another features of the present invention and attendant advantages thereof will become more readily apparent from the following descriptions taken in conjunction with the accompanying drawings in which:

FIG. 5 is a schematic graph illustrating operation of the embodiment shown in FIGS. 2 to 4.

DESCRIPTION OF PREFERRED EMBODIMENTS

Vehicle Structure

Figure 1:
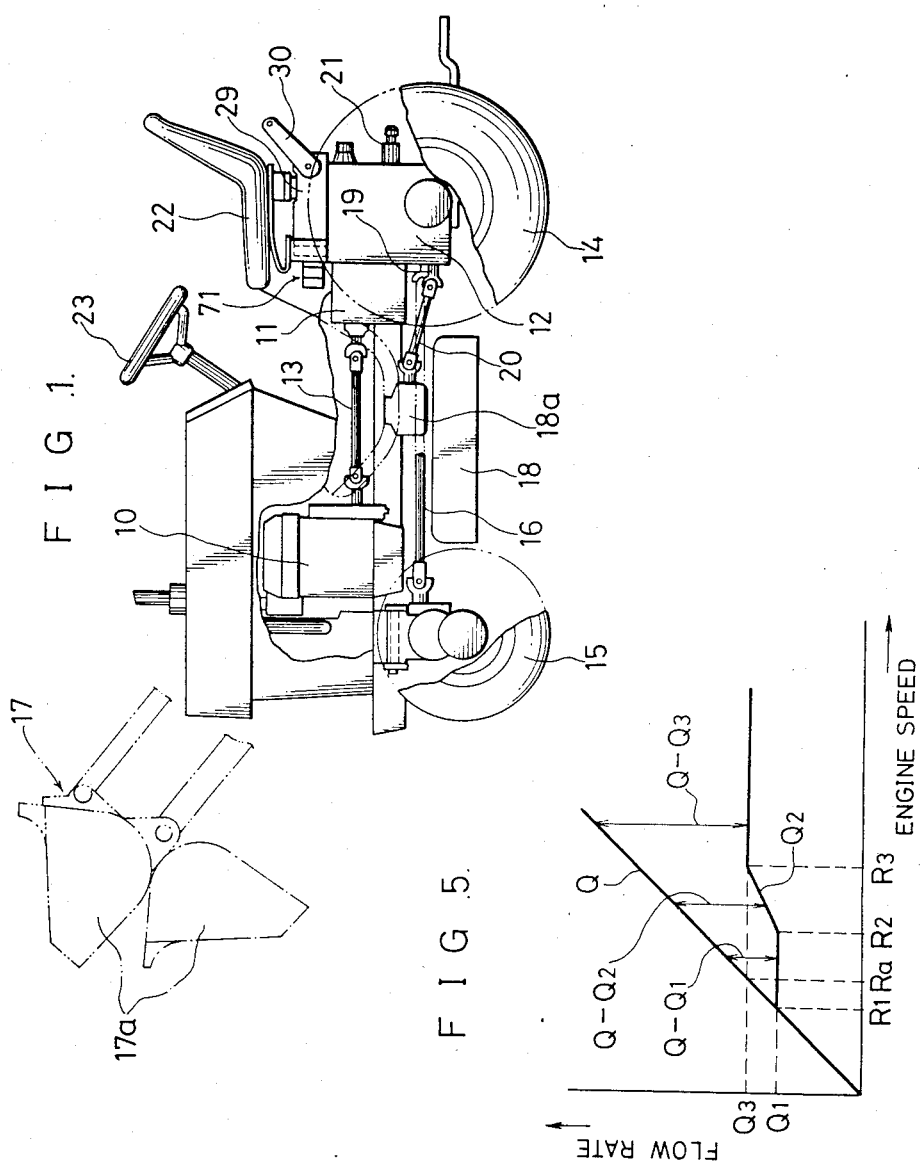
FIG. 1 is a schematic side view, partially cut away, of a working vehicle in which an embodiment of the hydraulic system according to the present invention is employed.

FIG. 1 shows schematically a working vehicle which is a relatively small tractor and in which a first preferred embodiment of the hydraulic system according to the present invention is employed.

As shown in FIG. 1, an engine 10 is mounted on the front of vehicle. On the rear of the vehicle are mounted a hydrostatic transmission 11 and a transmission case 12 which are in an overlapped relationship with each other in the longitudinal direction of vehicle. A transmission shaft 13 is provided for transmitting power from engine 10 to the hydrostatic transmission 11 from which power is in turn transmitted into transmission case 12. The vehicle shown is moved by driving left and right rear wheels 14 supported by the transmission case 12 and, when required, by driving also left and right front wheels 15 through a transmission shaft 16 for transmitting power from the inside of transmission case 12 to the front wheels.

The vehicle shown is fashioned such that it may be equipped with a front loader 17 having a liftable and tiltable bucket 17a at the front of vehicle, a mower 18 at a middle of and below the vehicle, and another working implements such as rotary tiller and grass collector at the rear of vehicle. For driving the mower 18, a mid PTO shaft 19 is provided which extends forwardly from the transmission case 12 and is connected to a gear box 18a for driving mower 18 through a transmission shaft 20. For driving a working implement drawn by the vehicle, a rear PTO shaft 21 is provided which extends rearwardly from the transmission case 12.

Hydraulic Power Steering Mechanism

Figure 2:
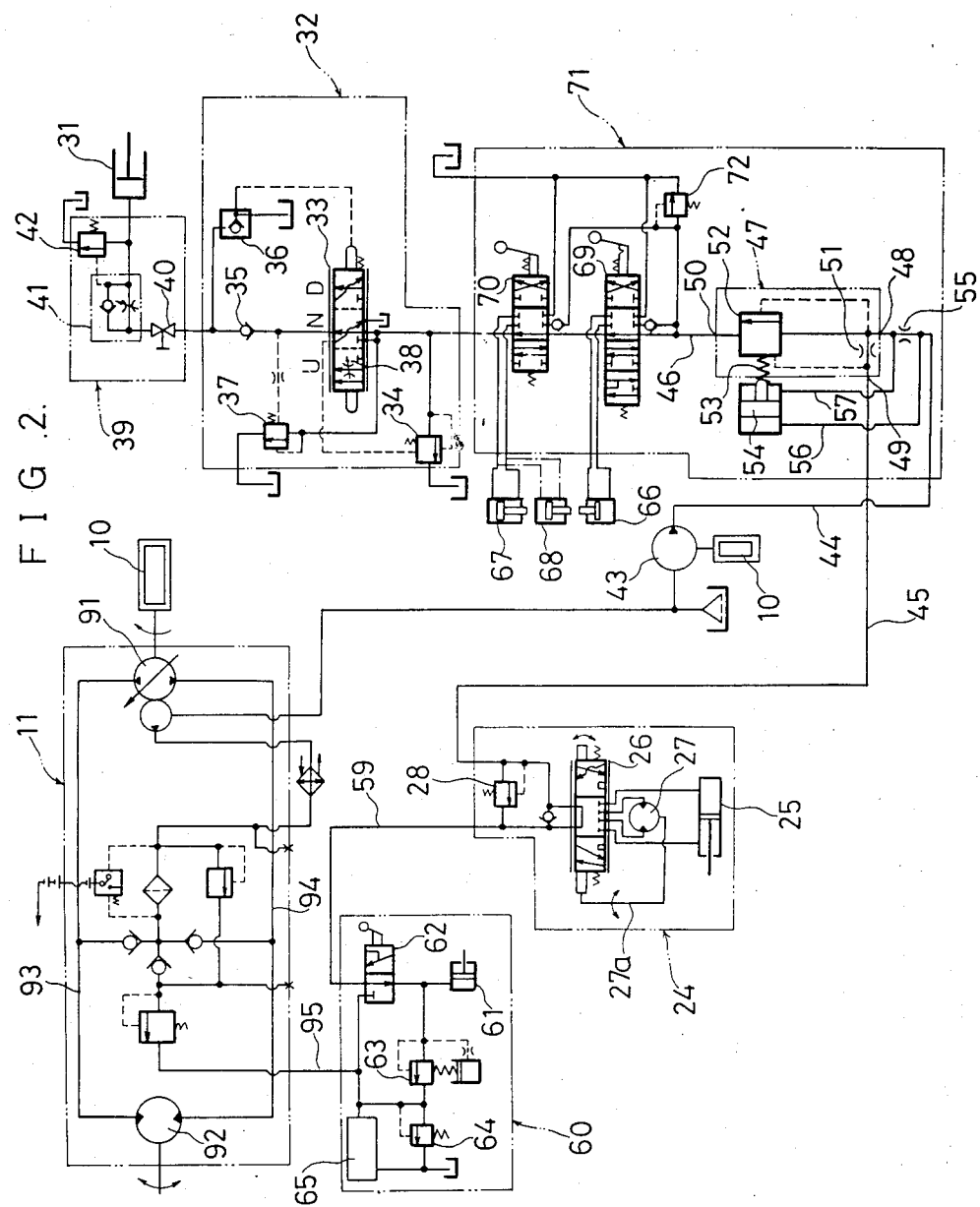
FIG. 2 is a diagram showing fluid circuit employed in the vehicle shown in FIG. 1.

The vehicle shown in FIG. 1 is steered by operator on a seat 22, located above the transmission case 12, by means of steering wheel 23 which, when handled, operates to turn the front wheels 15 through a hydraulic power steering mechanism 24 shown in FIG. 2.

As shown in FIG. 2, the power steering mechanism 24 includes a power cylinder 25 for turning the front wheels selectively into one or another direction and a directional control valve 26 which is displaced by the steering wheel 23 shown in FIG. 1 so as to control supply and drainage of fluid with respect to power cylinder 25. The control valve 26 shown is structured as a servo valve which is returned automatically to its neutral position by a metering motor 27 via feedback means 27a when the power cylinder 25 has been extended or contracted by an amount corresponding to the angle of revolution of the steering wheel 23. Power steering mechanism further includes a relief valve 28 for determining fluid pressure applied to the power cylinder 25 and metering motor 27.

Hydraulic Lift Mechanism

A working implement such as rotary tiller or grass collector which is selectively connected to the rear end of the vehicle by means of a link mechanism (not shown) so as to be drawn by the vehicle is selectively lifted and lowered by a hydraulic lift mechanism 29 mounted on the top of transmission case 12, as shown in FIG. 1. This mechanism 29 has a pair of left and right lift arms 30 which are, in use, pivotally connected to the link mechanism referred to above through a pair of tie rods (not shown).

As is usual, the hydraulic lift mechanism 29 includes a hydraulic lift cylinder 31 shown in FIG. 2. This lift cylinder 31 is operated so as to lift and lower the lift arms 30 under a control of control valve means 32 which includes a directional control valve 33 having three positions, namely neutral position N, implement-lifting position U and implement-lowering position D. The control valve means 32 further includes an unloader valve 34 for unloading fluid pressure at the neutral position N and lowering position D of control valve 33, non-return check valve 35 for preventing return of fluid from the lift cylinder 31 at the neutral position N of control valve 33, and unloader check valve 36 which, when the control valve 33 is displaced to the lowering position D, is displaced together to its open position so as to permit drainage of fluid from the lift cylinder 31. In the control valve means 32 shown, a relief valve 37 is provided to which fluid pressure in the downstream of control valve 33 is applied as back pressure so that it regulates the flow rate of fluid supplied to the lift cylinder 31 at the lifting position U of control valve 33 in cooperation with a variable area throttle 38 which is incorporated in such control valve 33 so as to be inserted in the fluid supply passage when the valve 33 is displaced to its lifting position U.

As also shown in FIG. 2, a final valve mechanism 39 is interposed between the control valve means 32 and lift cylinder 31. This valve mechanism 39 includes a stop valve 40 for selectively closing the fluid passage so as to stop the lift cylinder 31 when the lift mechanism is not used, slow-return valve means 41 having in-parallel connected check valve and adjustable area throttle for assuring a slow contraction of lift cylinder 31 while permitting a quick extension of such cylinder, and overload-relief valve 42 for preventing the lift cylinder 31 from being subjected to an excessive fluid pressure.

Hydraulic Circuit

FIG. 2 illustrates hydraulic circuit provided in the vehicle shown in FIG. 1.

A single hydraulic pump 43 which is driven by the engine 10 is provided for supplying fluid under pressure to both of the power cylinder 25 and lift cylinder 31. Flow of fluid coming from such pump 43 through a fluid supply path 44 is divided into two flows one of which is directed towards the power cylinder 25 through a branch path 45 and the other of which is directed towards the lift cylinder 31 through another branch path 46. For this, a flow control valve means 47 is provided which has an inlet port 48 and first and second outlet ports 49 and 50.

This flow control valve means 47 includes therein an orifice 51, incorporated between inlet port 48 and first outlet port 49, and a relief valve 52 incorporated between inlet port 48 and second outlet port 50. As shown in FIG. 2, fluid pressure in the upstream of relief valve 52 is applied to such relief valve from one direction as a pilot pressure against biasing of valve spring 53 of the relief valve 52. Further, fluid pressure in the downstream of orifice 51 is applied to relief valve 52 from the other direction as another pilot pressure. It is thus seen that the flow control valve means 47 divides its inflow flowing into inlet port 48 into a constant flow flowing-out from the first outlet port 49 and a surplus flow flowing-out from the second outlet port 50. When inflow flowing into the inlet port 48 is less than the constant flow or flow rate to be secured at the first outlet port 49, all of such inflow is directed towards the first outlet port 49 so that no flow is obtained in the second outlet port 50. The first outlet port 49 is connected to the branch path 45 and, therefore, to the power cylinder 25, whereas the second outlet port 50 is connected to another branch path 46 and, therefore, to the lift cylinder 31.

Flow or flow rate secured at the first outlet port 49 of flow control valve means 47 is determined by the flow area of orifice 51 and by the biasing force of valve spring 53 of the relief valve 52. For varying the biasing force of spring 53 so as to vary flow rate secured at the first outlet port 49, a piston 54 is provided which is disposed coaxially with valve spring 53 and receives the base end of such spring. This piston 54 is arranged so that it is movable axially within a predetermined range between one end position, where biasing force of the spring 53 is made smallest, and another end position where such biasing force is made largest, as will be detailed later by referring to FIGS. 3 and 4.

The inlet port 48 of flow control valve means 47 is connected to the single pump 43 via fluid supply path 44 referred to before. The hydraulic system shown is fashioned such that position of the piston 54 is determined by output flow rate of the pump 43 and, therefore, by engine speed. For this, another orifice 55 is incorporated in the fluid supply path 44. Fluid pressure in the upstream of this orifice 55 is applied to piston 54 via fluid path 56 so as to urge the piston 54 towards valve spring 53, whereas fluid pressure in the downstream of such orifice 55 is applied to piston 54 via fluid path 57 so as to urge the piston 54 away from valve spring 53.

It is thus seen that, when output flow of the pump 43 is small due to a low engine speed so that pressure differential across the orifice 55 is small, piston 54 is urged by valve spring 53 rather than by pressure differential across the orifice 55 so that the piston takes one end position where biasing force of the spring 53 is made smallest. As the output flow of pump 43 is enlarged due to increase of engine speed so that pressure differential across the orifice 55 is enlarged, piston 54 is moved towards valve spring 53 so as to make the biasing force of such spring larger. Flow area of the orifice 55 is present so that piston 54 is moved from its one end position to its another end position, where biasing force of the spring 53 is made largest, by pressure differential caused across the orifice 55 within a predetermined low range of output flow of the pump 43 and, therefore, within a predetermined low range of engine speeds, as will be described in great detail later by referring to FIGS. 3 to 5.

The hydraulic circuit or system shown in FIG. 2 is fashioned such that fluid supplied to the power steering mechanism 24 is then supplied through a fluid path 59 to a clutch-actuating mechanism 60 for a friction clutch (not shown) which is disposed within transmission case 12 shown in FIG. 1. Such actuating mechanism 60 includes an actuator cylinder 61, directional control valve 62 for such cylinder 61, relief valve 63 for determining fluid pressure applied to the cylinder 61, and another or secondary relief valve 64 for determining fluid pressure of lubricant fluid supplied to parts 65 to be lubricated such as friction elements of the clutch.

The hydraulic system shown in further fashioned such that fluid supplied to the branch path 46 through the flow control valve means 47 may also be used for actuating a bucket-lifting cylinder 66 for lifting and lowering the bucket 17a shown in FIG. 1, bucket-tilting cylinder 67 for tilting such bucket 17a and mower-lifting cylinder 68 for lifting and lowering the mower 18 shown in FIG. 1 which is supported by the vehicle through a link mechanism (not shown). A directional control valve 69 is provided for controlling operation of the bucket-lifting cylinder 66 and another directional control valve 70 is provided for controlling operation of each of the bucket-tilting cylinder 67 and mower-lifting cylinder 68 one of which is used selectively at a time. These directional control valves 69 and 70 are fashioned such that they permits at their neutral positions flow of fluid towards the lift cylinder 31 through the path 46 which is connected to such cylinder through the control valve means 32 and final valve mechanism 39 referred to before. The first and second flow control valve means 47 and 48 and two directional control valves 69 and 70 are included in a valve assembly 71 which also includes a relief valve 72 for determining fluid pressure applied to each of the cylinders 31, 66, 67 and 68.

FIG. 2 also illustrates hydraulic elements of the hydrostatic transmission 11 shown in FIG. 1. As is conventional, this transmission 11 comprises variable displacement pump 91 and fixed displacement motor 92 which are connected with each other by a pair of fluid paths 93 and 94. A fluid drain path 95 from the hydrostatic transmission 11 is connected to parts 65 in the clutch-actuating mechanism 60 for supplementing lubricant fluid.

Valve Structure

Figure 3:
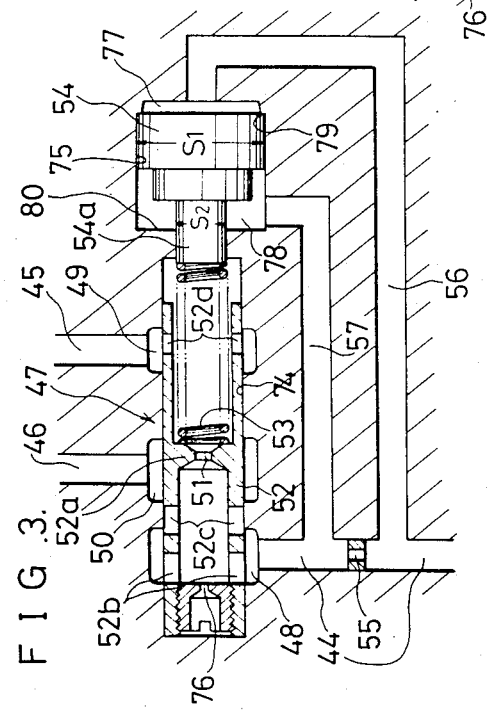
FIG. 3 is a schematic sectional view, partially developed, of a valve casing employed in the vehicle shown in FIG. 1.
Figure 4:
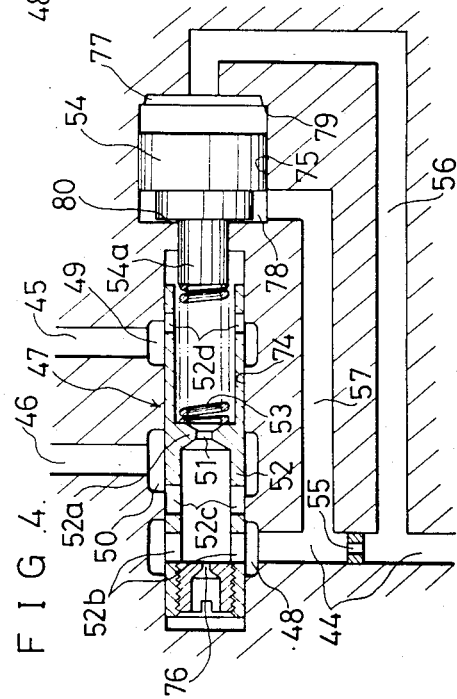
FIG. 4 is a schematic sectional view similar to FIG. 3 but illustrating a state different from that shown in FIG. 3.

The valve assembly 71 shown in FIG. 2 is fixedly mounted on the front of hydraulic lift mechanism 29, as shown in FIG. 1. FIGS. 3 and 4 illustrate schematically a part of such valve assembly 71.

As shown in FIGS. 3 and 4, a valve casing is provided within which valve-receiving bore 74 for the relief valve 52 and cylinder bore 75 for the piston 54 are formed coaxially with one another. The inlet port 48 and first and second outlet ports 49 and 50 of flow control valve means 47 are provided by three annular recesses or grooves which are formed to the circumferential wall of valve-receiving bore 74 intermittently along the axial direction of such bore. Fluid paths 44, 45 and 46 set forth before by referring to FIG. 2 are formed in the valve casing so that these paths communicate with corresponding ports 48, 49 and 50, respectively.

Relief valve 52 of the flow control valve means 47 is slidably disposed within valve-receiving bore 74. This valve 52 is shaped hollow and includes therein a partition 52a to which a perforation providing the orifice 51 set forth before by referring to FIG. 2 is formed. Relief valve 52 is further formed intermittently along its axial direction with three sets of radial perforations 52b, 52c and 52d, namely perforations 52b for communicating the upstream side of orifice 51 with inlet port 48, perforations 52c for communicating the upstream side of orifice 51 with second outlet port 50, and perforations 52d for communicating the downstream side of orifice 51 with first outlet port 49. The valve spring 53 set forth before by referring to FIG. 2 is disposed so that it acts upon the relief valve 52 at the partition 52a so as to bias such valve 52 in cooperation with fluid pressure in the downstream of orifice 51 to move towards a direction such that communicating area between perforations 52c and second outlet port 50 is narrowed. Against such biasing of spring 53, fluid pressure in the upstream of orifice 51 is applied to the valve 52 through a throttled fluid passage 76 which is formed in a tubular member threadingly fitted in a base end portion of relief valve 52.

As also shown in FIGS. 3 and 4, the piston 54 set forth before by referring to FIG. 2 is slidably disposed within the cylinder bore 75 so that one and another fluid chambers 77 and 78 are defined within the bore 75. Piston 54 has a rod portion 54a which extends into valve-receiving bore 74 through a bore formed in the valve casing between bores 74 and 75. The base end of valve spring 53 is received by piston 54 at the free end face of such rod portion 54a. A pair of stop surfaces 79 and 80 of the valve casing are faced to the piston 54 for limiting the motion of such piston. One end position or most retreated position of piston 54 shown in FIG. 3 is determined by a stop surface 79 disposed oppositely to valve-receiving bore 74, whereas another end position or most advanced position of piston 54 is determined by another stop surface 80 disposed at the side of valve-receiving bore 74.

The orifice 55 set forth before by referring to FIG. 2 is provided by a tubular member which is threadingly or otherwise fitted in the fluid supply path 44. Fluid paths 56 and 57 set for before by referring to FIG. 2 are formed in the valve casing so as to communicate the upstream side and downstream side of orifice 55 with fluid chambers 77 and 78 in the cylinder bore 75, respectively.

It is thus seen that position of the piston 54 is controlled by pressure differential caused across the orifice 55. Body portion of the piston 54 shown in FIGS. 3 and 4 has a cross-sectional area $S_1$ shown in FIG. 3 which is equal to the cross-sectional area of cylinder bore 75. The rod portion 54a has a cross-sectional area $S_2$ shown in FIG. 3 which is smaller than $S_1$. Consequently, fluid pressure in the chamber 78 is applied to the piston 54 at an area of $S_1-S_2$ while fluid pressure in the chamber 77 is applied to such piston 54 at the area of $S_1$. Piston 54 is also subjected at the free end face of rod portion 54a to fluid pressure in the downstream of orifice 51 of the flow control valve means 47. Provided that fluid pressure in the fluid supply path 44 is $P_1$ at the upstream side of orifice 55 and $P_2$ at the downstream side of orifice 55 and that fluid pressure in the downstream of orifice 51 of the flow control valve means 47 is $P_3$, pressure differential $\delta Pa$ across the former orifice 55 and pressure differential $\delta Pb$ across the latter orifice 51 are given by the following formulas:

$$\delta Pa = P_1 - P_2 \qquad (1)$$

$$\delta Pb = P_2 - P_3 \qquad (2)$$

Provided that biasing fore of the valve spring 53 of flow control valve means 47 is F at the state shown in FIG. 3 where piston 54 takes the most retreated position, forces Fa and Fb urging the piston 54 towards and away from relief valve 52 at such state are given, respectively, by the following formulas:

$$Fa = P_1 \times S_1 \qquad (3)$$

$$Fb = P_2 \times (S_1 - S_2) + P_3 \times S_2 + F \qquad (4)$$

Thus, force urging the piston 54 towards relief valve 52 is given by the following formula:

$$Fa - Fb = (P_1 - P_2) \times S_1 + (P_2 - P_3) \times S_2 - F \qquad (5)$$

$$= \delta Pa \times S_1 + \delta Pb \times S_2 - F$$

It is thus seen that, if only the areas $S_1$ and $S_2$ are selected appropriately relative to the biasing force F of spring 53, the piston 54 will become advanced towards the relief valve 52 from a point of time when the pressure differential $\delta Pa$ is enlarged to a certain value. Although the biasing force of valve spring 53 becomes enlarged as the piston 54 becomes advanced, the pressure differentials $\delta Pa$ and $\delta Pb$ become enlarged with the increase of output flow of pump 43 and, therefore, with the increase of rotation speed of pump 43 so that advance of the piston 54 to the end position shown in FIG. 4 may be achieved. Flow area of the orifice 55 is preset such that pressure differential resulting in the advance movement of piston 54 from the position shown in FIG. 3 to the position shown in FIG. 4 is caused across such orifice within a predetermined low range of rotation speed of pump 43.

Operation

In operation, flow control valve means 47 shown in FIGS. 2 to 4 divides its inflow flowing into the inlet port 48 into two flows in a condition such that the relief valve 52 takes a position where perforations 52c are overlapped, as shown in FIG. 4, with the second outlet port 50. So far as the biasing force of valve spring 53 is kept constant, a constant flow is secured at the first outlet port 49 while a surplus flow in excess of such constant flow is obtained in the second outlet port 50. Biasing force of the valve spring 53 is varied within a predetermined range in accordance with the position of piston 54. The larger the biasing force is, the larger the flow rate in the first outlet port 49 is. Consequently, flow or flow rate secured at the first outlet port 49 is varied between a minimum flow rate obtained at the most retreated position of piston 54 shown in FIG. 3 and a maximum flow rate obtained at the most advanced position of piston 54 shown in FIG. 4.

In a condition in which a working implement such as rotary tiller to be lifted and lowered by means of hydraulic lift mechanism 29 is connected to the rear of the vehicle shown in FIG. 1, the hydraulic system shown in FIGS. 2 to 4 will thus operates as follows:

FIG. 5 illustrates schematically the relationship between rotation speed of engine 10 and, therefore, pump 43 and output flow of the pump 43 as well as flow or flow rate supplied towards the power steering cylinder 25. Output flow Q of pump 43 is increased with the increase of engine speed approximately at a constant ratio. In FIG. 5, $R_2$ designates an engine speed, at which advance movement of the piston 54 from the most reatreated position shown in FIG. 3 is initiated, and $R_2$ designates another engine speed at which piston 54 has been advanced to the most advanced position shown in FIG. 4. Piston 54 is kept at the most reatreated position shown in FIG. 3 when engine speed is smaller than $R_2$, whereas such piston 54 is kept at the most advanced position shown in FIG. 4 when engine speed is larger than $R_3$.

Provided that flow control valve means 47 operates to secure a constant flow of $Q_1$ at the first outlet port 49 in the condition where piston 54 takes the end position shown in FIG. 3 so that the biasing force of valve spring 53 is made minimum, all of the inflow flowing into the inlet port 48 is directed to the first outlet port 49 until engine speed has been increased to $R_1$ shown in FIG. 5 at which output flow Q of the pump 43 is made equal to $Q_1$. All of the output flow of pump 43 is thus directed towards the power cylinder 25 through flow control valve means 47 and via branch path 45.

At an engine speed between $R_1$ and $R_2$, a flow substracted the constant flow $Q_1$ from pump output flow Q ($Q-Q_1$) is obtained in the second outlet port 50 and is directed towards the lift cylinder 31 via branch path 46 while the constant flow $Q_1$ is directed towards the power cylinder 25.

Within the range of engine speeds between $R_2$ and $R_3$, flow secured at the first outlet port 49 is increased with the increase of engine speed because biasing force of the valve spring 53 is increased with the increase of engine speed. Provided that flow secured at the first outlet port 49 within such range of engine speeds is $Q_2$ shown in FIG. 5, flow substracted such flow $Q_2$ from pump output flow Q ($Q-Q_2$) is obtained in the second outlet port 50 and is directed towards lift cylinder 31 while flow of $Q_2$ is directed towards power cylinder 25.

Provided that flow control valve means 47 operates to secure a constant flow of $Q_3$ shown in FIG. 5 at the first outlet port 49 in the condition where piston takes the end position shown in FIG. 4 so that the biasing force of valve spring 53 is made maximum, such constant flow $Q_3$ is directed towards power cylinder 25 at engine speeds larger than $R_3$. Power cylinder 25 is thus supplied with the constant flow $Q_3$ at the normal range of engine speed. At such range of engine speed, flow substracted the constant flow $Q_3$ from pump output flow Q ($Q-Q_3$) is obtained in the second outlet port 50 and is directed towards lift cylinder 31.

In the low range of engine speed below $R_3$, output flow Q of pump 43 is less than the constant flow $Q_3$. Accordingly, if a hydraulic system which comprises a flow control valve means corresponding to the valve means 47 shown but having no piston corresponding to the piston 54 shown for varying the biasing force of spring were employed for the purpose of securing the constant flow $Q_3$ for power cylinder 25 at the normal speed range of engine, no fluid would then be directed towards lift cylinder 31 at an engine speed below a speed Ra shown in FIG. 5, at which pump output flow Q is equal to $Q_3$, and flow having a small valve $Q-Q_3$ would be directed towards lift cylinder 31 at engine speeds between Ra and $R_3$. Contrarily to this, the hydraulic system shown in FIGS. 2 to 4 will secure a flow for the lift cylinder 31 from the engine speed $R_1$ lower than Ra in a fashion such that flow rate $Q-Q_1$ or $Q-Q_2$ much larger than $Q-Q_3$ is directed towards lift cylinder 31 at the low speed range of engine between $R_1$ and $R_3$.

It is thus seen that, when the directional control valve 33 shown in FIG. 2 is shifted into its implement-lifting position U at a low engine speed for operating the lift cylinder 31 to extend so as to lift a working implement drawn by the vehicle, the lift cylinder 31 will extend with a substantial speed so as to lift the working implement relatively quickly. Although flow directed towards power cylinder 25 in such low range of engine speed has a relatively low value $Q_1$ or $Q_2$, vehicle is travelled necessarily with a very low speed in this low range of engine speed so that a reduded speed of turning of the front wheels 15 for steering will cause no dangerous state.

Engine speeds $R_2$ and $R_3$ shown in FIG. 5 may be varied by exchanging the orifice 55 incorporated in the fluid supply path 44.

Alternative Valve Structure

Figure 6:
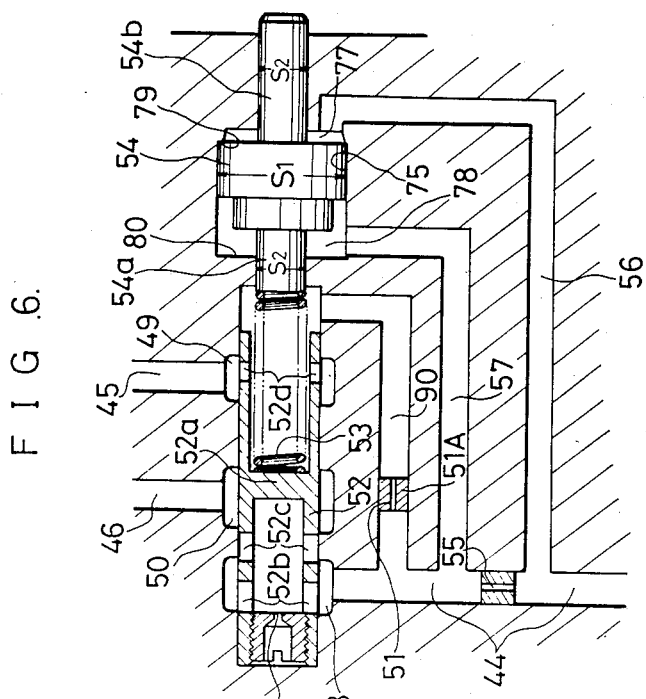
FIG. 6 is a schematic sectional view similar to FIG. 3 but showing another embodiment of the present invention.

FIG. 6 illustrates an alternative valve structure wherein orifice 51 of the flow control valve means is provided by a tubular member 51A threadingly or otherwise fitted in a fluid path 90 which is formed in the valve casing so as to communicate the fluid supply path 44 with valve-receiving bore 74 at the space where valve spring 53 is disposed. Partition 52a of the hollow relief valve 52 has thus no perforation for providing such orifice.

Piston 54 shown in FIG. 6 has on its rear face another rod portion 54b having a cross-sectional area $S_2$ which is equal to that of the rod portion 52a on the front face of the piston. Such another rod portion 54b is slidably received by the valve casing so that fluid pressure in the chamber 77 is applied to the piston at an area of $S_1-S_2$. In the structure shown in FIG. 6, force urging the piston 54 towards the relief valve 52 is represented by the following formula which corresponds to the aforestated formula (5):

$$Fa-Fb=(\delta Pa+\delta Pb)\times S_3-F \quad (6)$$

where $S_3$ is $S_1-S_2$. Piston 54 may thus be advanced from the most retreated position shown in FIG. 6 to the most advanced position determined by the stop surface 80 if only the area differential S is preset relatively large and flow area of the orifice 55 providing the pressure differential $\delta Pa$ is preset relatively small.

Another parts of the structure shown in FIG. 6 are fashioned similarly to the corresponding parts of the structure shown in FIGS. 3 and 4 and are designated by like numerals.

The valve structure shown in FIG. 6 may also be incorporated in the hydraulic system shown in FIG. 2 and will operated similarly as the valve structure shown in FIGS. 3 and 4 does.

We claim:

1. In a working vehicle comprising a hydraulic power steering mechanism, including a power cylinder, and a hydraulic lift mechanism including a lift cylinder, said power cylinder and said lift cylinder being powered by a single pump driven by engine, a hydraulic system comprising:

a flow control valve means (47) having an inlet port (48) connected to said pump (43) via a fluid supply path (44), a first outlet port (49) connected to said power cylinder (25) and a second outlet port (50) connected to said lift cylinder (31), said control valve means including therein an orifice (51) incorporated between said inlet port and said first outlet port and a relief valve (52) incorporated between said inlet port and said second outlet port, said relief valve being fashioned such that, while fluid pressure in the upstream thereof is applied against biasing of a valve spring (53) thereof as a pilot pressure, fluid pressure in the downstream of said orifice is applied as another pilot pressure opposing said pilot pressure so that inflow flowing into said inlet port is divided into a constant flow directed towards said power cylinder through said first outlet port and a surplus flow in excess of said constant flow directed towards said lift cylinder through said second outlet port, said constant flow being determined by the flow area of said orifice and by the biasing force of said valve spring;

a piston (54) disposed coaxially with said valve spring (53) of said relief valve (52) and receiving the base end of said valve spring, said piston being movable axially within a predetermined range so as to vary the biasing force of said valve spring; and another orifice (55) incorporated in said fluid supply path (44) between said pump (43) and said flow control valve means (47), fluid pressure in the upstream of said another orifice being applied to said piston (54) so as to urge said piston towards said valve spring (53) and fluid pressure in the downstream of said another orifice being applied to said piston so as to urge said piston away from said valve spring, flow area of said another orifice being preset so that said piston is moved from its one end position to its another end position by pressure differential caused across said another orifice within a predetermined low speed range of said pump (43).

2. A hydraulic system as claimed in claim 1 in which said relief valve (52) includes therein a perforation communicated at one side to said inlet port (48) and at the other side to said first outlet port (49), said orifice (51) of said flow control valve means (47) being provided by said perforation.

3. A hydraulic system as claimed in claim 2 in which said relief valve (52) is shaped hollow and has therein a partition (52a), said perforation providing said orifice (51) being formed to said partition.

4. A hydraulic system as claimed in claim 3 in which said valve spring (53) is arranged such that it acts upon said relief valve (52) at said partition (52a).

* * * * *